United States Patent
Said et al.

(10) Patent No.: US 9,256,840 B2
(45) Date of Patent: Feb. 9, 2016

(54) ESTABLISHING BUSINESS NETWORKS USING A SHARED PLATFORM

(75) Inventors: Bare Said, St Leon-Rot (DE); Peter Eberlein, Malsch (DE)

(73) Assignee: SAP SE, Walldorf (DE)

(*) Notice: Subject to any disclaimer, the term of this patent is extended or adjusted under 35 U.S.C. 154(b) by 390 days.

(21) Appl. No.: 13/309,171

(22) Filed: Dec. 1, 2011

(65) Prior Publication Data

US 2013/0144945 A1   Jun. 6, 2013

(51) Int. Cl.
  *G06F 15/16* (2006.01)
  *G06Q 10/00* (2012.01)
  *G06Q 30/00* (2012.01)
  *G06Q 50/00* (2012.01)

(52) U.S. Cl.
  CPC .............. *G06Q 10/00* (2013.01); *G06Q 30/00* (2013.01); *G06Q 50/01* (2013.01)

(58) Field of Classification Search
  CPC ....... G06Q 30/00; G06Q 50/01; G06Q 10/00; G06F 15/16
  USPC ............. 709/204, 231, 205, 237; 707/792, 10
  See application file for complete search history.

(56) References Cited

U.S. PATENT DOCUMENTS

| | | | |
|---|---|---|---|
| 7,068,769 B1 * | 6/2006 | Weaver et al. | 379/201.1 |
| 7,139,798 B2 * | 11/2006 | Zircher et al. | 709/204 |
| 7,546,359 B2 * | 6/2009 | Tierney et al. | 709/223 |
| 7,657,575 B2 | 2/2010 | Eberlein et al. | |
| 7,702,650 B2 | 4/2010 | Brunswig et al. | |
| 7,720,992 B2 | 5/2010 | Brendle et al. | |
| 7,725,907 B2 | 5/2010 | Bloching | |
| 7,730,412 B2 | 6/2010 | Said | |
| 7,734,648 B2 | 6/2010 | Eberlein | |
| 7,739,387 B2 | 6/2010 | Eberlein et al. | |
| 7,752,253 B2 * | 7/2010 | Manion et al. | 709/200 |
| 7,877,695 B2 | 1/2011 | Brunswig et al. | |
| 7,900,190 B2 | 3/2011 | Brunswig et al. | |
| 7,971,209 B2 | 6/2011 | Eberlein et al. | |
| 2002/0078150 A1 * | 6/2002 | Thompson et al. | 709/204 |
| 2003/0105816 A1 * | 6/2003 | Goswami | 709/204 |
| 2003/0204448 A1 * | 10/2003 | Vishik et al. | 705/27 |

(Continued)

OTHER PUBLICATIONS

U.S. Appl. No. 13/212,641, filed Aug. 18, 2011, Said et al.

(Continued)

*Primary Examiner* — Wing F Chan
*Assistant Examiner* — Benjamin M Thieu
(74) *Attorney, Agent, or Firm* — Fish & Richardson P.C.

(57) ABSTRACT

The present disclosure describes methods, systems, and computer program products for establishing business networks based on shared usage of a common platform. One process includes receiving a set of registry data associated with a collaboration system from a first network participant executing a first application based on a first application platform. A request from a second network participant executing a second application on a compatible platform to the first application platform to access the set of registry data from the first network participant is received. Access is provided to the second network participant of a subset of data shared by the first network participant for collaboration. In some instances, providing access to the second network participant can include identifying a user associated with the second network participant to provide data access with the first network participant and assigning corresponding access authorizations to development entity instances associated with the identified user.

21 Claims, 6 Drawing Sheets

(56) References Cited

U.S. PATENT DOCUMENTS

| | | | |
|---|---|---|---|
| 2003/0217171 A1* | 11/2003 | Von Stuermer et al. | 709/231 |
| 2006/0053194 A1* | 3/2006 | Schneider et al. | 709/204 |
| 2007/0004389 A1* | 1/2007 | Wallace et al. | 455/415 |
| 2007/0233728 A1 | 10/2007 | Puteick et al. | |
| 2007/0239800 A1 | 10/2007 | Eberlein | |
| 2007/0255715 A1* | 11/2007 | Li et al. | 707/10 |
| 2007/0260643 A1* | 11/2007 | Borden et al. | 707/201 |
| 2008/0005623 A1 | 1/2008 | Said | |
| 2008/0082575 A1 | 4/2008 | Peter et al. | |
| 2008/0288960 A1 | 11/2008 | Eberlein et al. | |
| 2009/0132653 A1* | 5/2009 | Niazi | 709/204 |
| 2009/0144721 A1 | 6/2009 | Wagner et al. | |
| 2010/0036914 A1* | 2/2010 | Chesta | 709/205 |
| 2010/0049812 A1* | 2/2010 | Brown et al. | 709/206 |
| 2010/0228788 A1 | 9/2010 | Eberlein | |
| 2011/0074587 A1* | 3/2011 | Hamm et al. | 340/584 |
| 2011/0107088 A1* | 5/2011 | Eng et al. | 713/155 |
| 2011/0138394 A1* | 6/2011 | Ravishankar et al. | 718/104 |
| 2011/0145571 A1 | 6/2011 | Schmidt-Karaca et al. | |
| 2011/0191417 A1* | 8/2011 | Rathod | 709/204 |
| 2012/0239699 A1* | 9/2012 | Anand et al. | 707/792 |
| 2012/0331168 A1* | 12/2012 | Chen | 709/231 |
| 2013/0060849 A1* | 3/2013 | Zimmet et al. | 709/204 |
| 2013/0103686 A1* | 4/2013 | Sisneros | 707/736 |

OTHER PUBLICATIONS

U.S. Appl. No. 13/162,442, filed Jun. 16, 2011, Said et al.
U.S. Appl. No. 13/240,595, filed Sep. 22, 2011, Driesen et al.
U.S. Appl. No. 13/207,151, filed Aug. 10, 2011, Said et al.
U.S. Appl. No. 12/975,813, filed Dec. 22, 2010, Brunswig et al.
U.S. Appl. No. 12/975,096, filed Dec. 21, 2010, Jentsch et al.

* cited by examiner

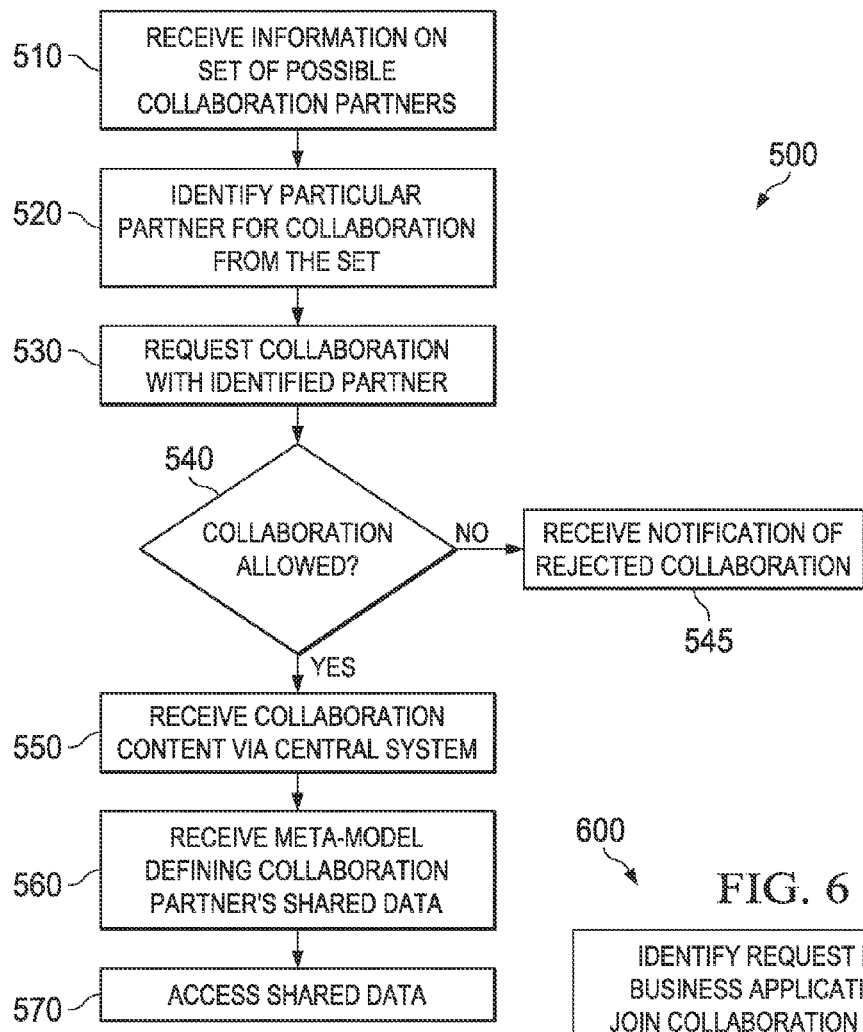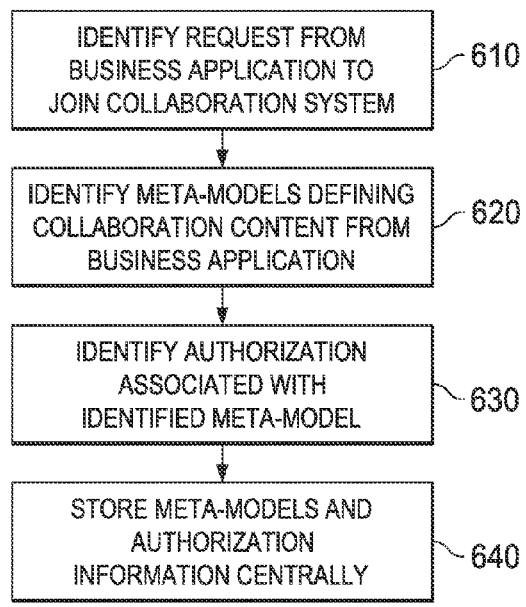

ESTABLISHING BUSINESS NETWORKS USING A SHARED PLATFORM

TECHNICAL FIELD

The present disclosure relates to software, computer systems, and computer-implemented methods for establishing business networks.

BACKGROUND

A successful business or social network is usually supported by many active users and manifested with a large archived database contributed by the active users. In many instances, the successful business or social network needs to refrain from collection of subscription fees when there is limited tangible benefit for participants. Successful networks, such as Facebook, MySpace, Twitter, and others, attract users by providing free services by first investing in development of a website or a central server system. Users, in turn, by actively providing data to the website or the central server system for exchanging information in their networks, establish and prosper relationships with other users. Upon agreement, the data shared by the users can be used for revenue generating activities to recover and possibly make profits for the initial website or central server system investment.

SUMMARY

The present disclosure describes methods, systems, and computer program products for establishing business networks. The present disclosure describes methods, systems, and computer program products for establishing business networks based on shared usage of a common platform. One process includes receiving a set of registry data associated with a collaboration system from a first network participant executing a first application based on a first application platform. A request from a second network participant executing a second application on a compatible platform to the first application platform to access the set of registry data from the first network participant is received. Access is provided to the second network participant of a subset of data shared by the first network participant for collaboration. In some instances, providing access to the second network participant can include identifying a user associated with the second network participant to provide data access with the first network participant and assigning corresponding access authorizations to development entity instances associated with the identified user.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 illustrates an example method for obtaining shared data on the business network from a user perspective.

FIG. 6 illustrates an example method for receiving new collaboration data on the business network from a system perspective.

DETAILED DESCRIPTION

Figure 1A:
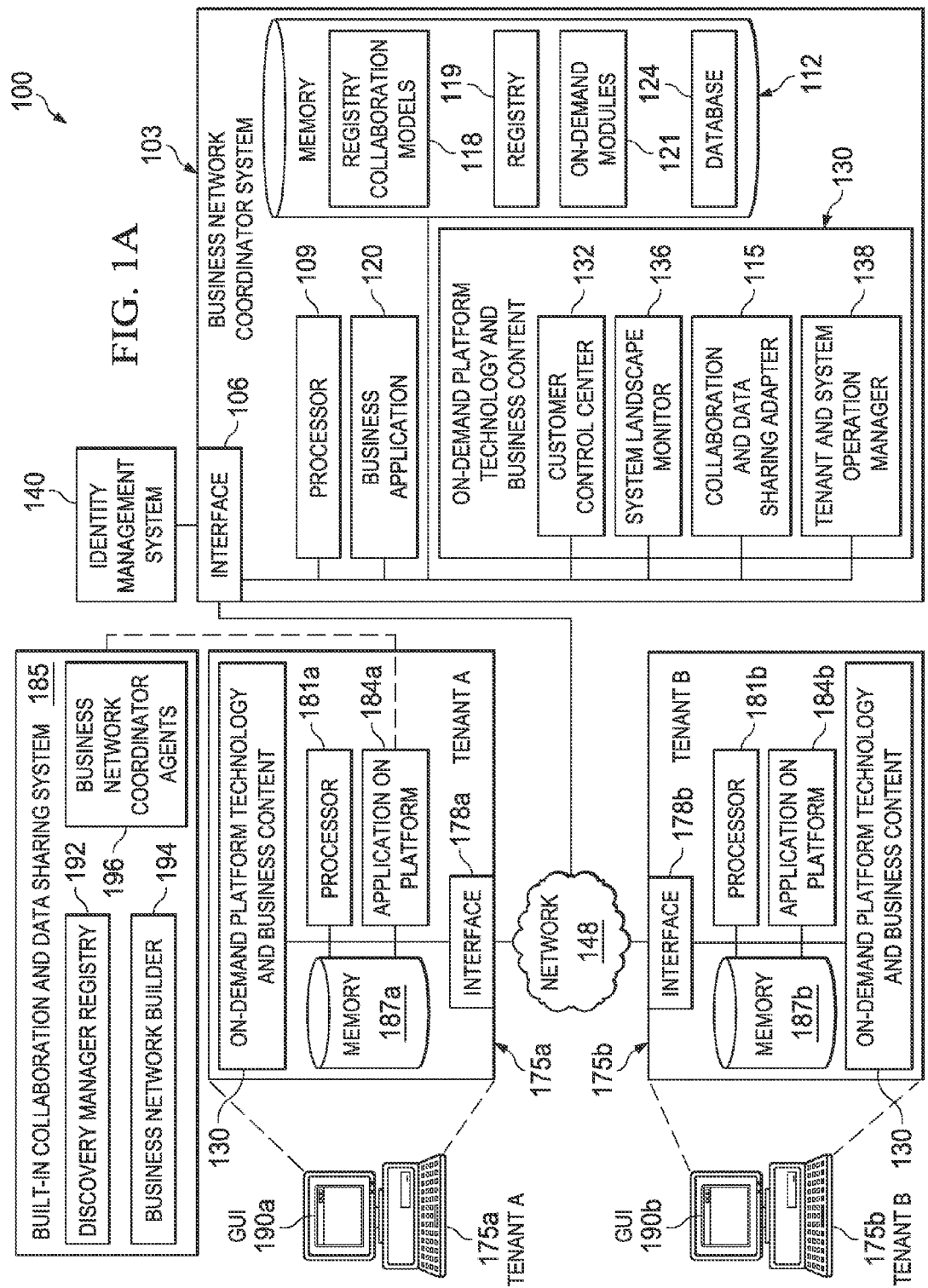
FIG. 1A illustrates an example environment for implementing various features of a system for establishing a business network using shared platform.

This disclosure generally relates to software, computer systems, and computer-implemented methods for establishing business networks. Specifically, tools and methods are used to enable users of a software-as-a-service (SaaS) system to build network connections and share business data. Additionally, different users can form and join network communities without being limited to any particular website or server or both. The present disclosure can reduce business network development costs by allowing each user on the same service or application platform to initiate and establish the network, with the built-in capabilities of the service platform. In addition to reducing the effort in establishing business networks in a platform-based environment, the present disclosure also enables users to define dynamically the maximum scope of data (e.g., types and attributes) that may be shared with other participants.

Software products can be built upon a platform, where the platform is used as a basis upon which multiple applications are developed. As one example, proprietary on-demand business process platforms can be used to create many on-demand products, as well as, networked applications (NWAs) built using at least a portion of the platform. In certain implementations, on-demand products can be a fully integrated enterprise resource planning (ERP), or business management software solutions. The on-demand products can be a complete SaaS system in which software and its associated data are hosted centrally (for example, in a cloud-computing environment), and are accessed by users using a thin client (e.g., a web browser) over the internet.

An on-demand product may include functionality for integrated end-to-end business processes across several modules, including Customer Relationship Management (CRM), Financial Management (FM), Project Management (PM), Supply Chain Management (SCM), Supplier Relationship Management (SRM), Human Resources Management (HRM), Executive Management Support (EMS), and Compliance Management (CM). CRM supports processes that span marketing, sales, and service activities. FM can be another module that helps provide companies with a single, up-to-date view of the financial condition by integrating core business processes and financials that span financial, management, accounting, and cash flow management. PM can contain an integrated project management solution. SCM can cover supply chain setup management, supply chain planning and control, and manufacturing, warehousing and logistics. SRM focuses on relationships with supplies, procurement processes aimed at reducing cost, and to perform self-service procurement. HRM spans organizational management, human resources, and employee self-service. EMS can empower management with more control over the business and better decision making, with real time analytics for tracking business aspects. CM helps companies maintain compliance with changing laws and regulations and to meet regulatory standards. Some, all, or other modules or functionalities may exist in particular on-demand products.

As users are engaging the on-demand products in their businesses, data in various aspects of the modules and functionalities are generated. Some of the data may be shared to promote their businesses and/or product uses. For example, data can be shared with other business partners to streamline supply and demand. Other data can be shared to attract future collaboration partners. By using a common platform among users of on-demand business applications, establishment of a business network can be facilitated between two or more of those users. The common platform may include use of an identical platform, different versions of the common platform, and different applications based on the common platform, among others. For example, collaboration, data-sharing and business network capabilities can be provided as embedded functionality in the on-demand business applications based on the common platform. Customers that are willing to participate in the network can be automatically visible to other network participants. Two or more customers can be connected to each other if both of them accept to establish a network relationship, which enables data sharing without restriction to specific data, information, and other collaboration materials.

FIG. 1A illustrates an example environment 100 for implementing various features of a system for establishing a business network using shared platform. The illustrated environment 100 includes, or is communicably coupled with, a business network coordinator system 103 which takes a coordinator role in a cloud-computing environment and at least two tenants: tenant A 175a and tenant B 175b. In some instances, the tenants 175a, 175b may co-reside on a single server or system, as appropriate. At least some of the communications between the business network coordinator system 103 and the tenants A 175a and B 175b may be performed across or via network 148. In general, environment 100 depicts an example configuration of a system for establishing business networks using applications built on a shared platform in a cloud computing environment, such as environment 100. The illustrated system includes development technology and hosted and managed services and applications built on top of the underlying platform technology. The business network coordinator system 103 represents a dedicated and/or ad hoc system built using the platform technology for coordinating collaboration with other systems associated with and executing on platform-related technology. The coordinating system is used to manage and operate the system and tenants belonging to the cloud computing environment, providing knowledge of and connections to the various systems, clients, and tenants therein. The business network coordinator system 103 is enhanced to support data sharing and collaboration capabilities. As illustrated, tenant A 175a and tenant B 175b can access certain business applications on the similar, or common, on-demand platform providing SaaS solutions. Tenant A 175a may provide information regarding data or other collaboration information created by or associated with itself to be shared with other users or systems to the business network coordinator system 103, with at least a portion of that data being published in a collaboration-related registry 119 for searching, viewing, and identifying the data by tenant B 175b and/or other tenants using the common platform. Tenant B 175b may invite tenant A 175a to establish a business network based on the shared information associated with tenant A 175a, as well as based on a business or social relationship between them. The environment 100 is an example and, in alternative implementations, the elements illustrated in FIG. 1A may be included in or associated with different and/or additional servers, clients, networks, and locations other than those as shown. For example, one or more of the components illustrated within the business network coordinator system 103 may be located in multiple or different servers, cloud-based or cloud computing networks, or other locations accessible to the business network coordinator system 103 (e.g., either directly or indirectly via network 148).

In general, the business network coordinator system 103 is any server or system that stores, manages, and executes functionality associated with an on-demand platform, including assisting in the establishing ad hoc collaboration business networks between two or more users or entities executing applications based on a common platform. In some instances, the business network coordinator system 103 may execute one or more business applications 120. For example, each business network coordinator system 103 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, each business network coordinator system 103 may store a plurality of various applications, while in other instances, business network coordinator systems 103 may be dedicated servers meant to store and execute the business applications 120, which is built based on the on-demand platform technology and business content 130 ("on-demand platform") using the on demand platform technology and on demand platform business content. The coordinator, or central, system 103 may be one or more dedicated servers for managing all systems/tenants that are part of a cloud computing environment. In some instances, the business network coordinator system 103 may comprise a web server or be communicably coupled with a web server, where one or more of the business applications 120 associated with the business network coordinator system 103 represent web-based (or web-accessible) applications accessed and executed through requests and interactions received on the tenants A 175a and B 175b (i.e., via application on platform 184a-b) operable to interact with the programmed tasks or operations of the corresponding on-demand platform 130 and/or business applications 120.

At a high level, the business network coordinator system 103 comprises an electronic computing device operable to receive, transmit, process, store, or manage data and information associated with the environment 100. The business network coordinator system 103 illustrated in FIG. 1A can be responsible for receiving application requests from one or more tenants A 175a and B 175b (as well as any other entity or system interacting with the business network coordinator system 103, including desktop or mobile client systems), responding to the received requests by processing said requests in the on-demand platform 130 and/or the associated business application 120, and sending the appropriate responses from the appropriate component back to the requesting tenants A 175a and B 175b or other requesting system. Components of the business network coordinator system 103 can also process and respond to local requests from a user locally accessing the business network coordinator system 103. Accordingly, in addition to requests from the tenants A 175*a* and B 175*b* illustrated in FIG. 1A, requests associated with a particular component may also be sent from internal users, external or third-party customers, and other associated business applications, business processes, as well as any other appropriate entities, individuals, systems, or computers. In some instances, either or both of the on-demand platform 130 and/or the business application 120 may be web-based applications executing functionality associated with a networked or cloud-based business process.

As used in the present disclosure, the term "computer" is intended to encompass any suitable processing device. For example, although FIG. 1A illustrates a single business network coordinator system 103, environment 100 can be implemented using any number of servers, as well as computers other than servers, including a server pool. Indeed, the business network coordinator system 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated business network coordinator system 103 may be adapted to execute any operating system, including Linux, UNIX, Windows, Mac OS, or any other suitable operating system.

In the illustrated implementation of FIG. 1A, the business network coordinator system 103 includes an interface 106, a processor 109, a memory 112, a business application 120, and the on-demand platform 130. In some instances, the business network coordinator system 103 and its illustrated components may be separated into multiple components executing at different servers and/or systems. For example, while FIG. 1A illustrates the business application 120 and the on-demand platform 130 as separate components, other example implementations can include the on-demand platform 130 within a separate system, as well as within as part of the business application's inherent functionality. Thus, while illustrated as a single component in the example environment 100 of FIG. 1A, alternative implementations may illustrate the business network coordinator system 103 as comprising multiple parts or portions accordingly.

FIG. 1A depicts a server-tenant environment, but could also represent a cloud computing network. Various other implementations of the illustrated environment 100 can be provided to allow for increased flexibility in the underlying system, including multiple business network coordinator systems 103 performing or executing one or more additional or alternative instances of the on-demand platform 130 and associated with a business application 120 for one or more different platforms, as well as multiple instances of the business application 120 and its related functionality. In those instances, the different business network coordinator systems 103 may communicate with each other via a cloud-based network or through the connections provided by network 148.

The interface 106 is used by the business network coordinator system 103 to communicate with other systems in a client-server or other distributed environment (including within environment 100) connected to the network 148 (e.g., one of the tenants A 175*a* and B 175*b*, as well as other systems communicably coupled to the network 148). The interface 106 generally comprises logic encoded in software and/or hardware in a suitable combination and operable to communicate with the network 148. More specifically, the interface 106 may comprise software supporting one or more communication protocols associated with communications such that the network 148 or the interface's hardware is operable to communicate physical signals within and outside of the illustrated environment 100. As illustrated in FIG. 1A, the interface 106 enables an identity management system 140 to connect with the business network coordinator system 103. The identity management system 140 may be used to identify users to whom access to shared data is granted when they access shared data across systems or tenants. The usage of one or more identity management systems provides support for single sign-on services to be supported, avoiding a need for users to re-authenticate when they access shared data on other tenants. To avoid re-authentication, the identity management system 140 can provide the required user mapping.

The identity management system 140 can identify and manage users (related to particular tenants) in a system (such as a country, a network, or an organization) and control access to the resources in that system by placing restrictions on the established identities of the tenants. The identity management system 140 can be multidisciplinary and covers many dimensions, such as technical, legal, security and organizational dimensions. In some implementations, an identity can be constructed from a small set of axiomatic principles. For example, all identities in a given abstract namespace may be unique and distinctive, and/or such identities can bear a specific relationship to corresponding entities in the real world. An axiomatic model of this kind can be considered to express "pure identity" in the sense that the model is not constrained by the context in which it is applied. In general, an entity and/or user can have multiple identities, and each identity can consist of multiple attributes or identifiers, some of which are shared and some of which are unique within a given name space. The identity management system 140 can perform and/or support user mapping to the same identity, removing a need to re-authenticate uses when the same identity attempts access over a particular tenant or system, such as when accessing collaboration data on different systems. In some instances, the identity management system 140 may be communicably coupled to the business network coordinator system 103 via network 148.

Generally, the business network coordinator system 103 may be communicably coupled with a network 148 that facilitates wireless or wireline communications between the components of the environment 100 (i.e., between the business network coordinator system 103 and/or one or more tenants A 175*a* and B 175*b*), as well as with any other local or remote computer, such as additional clients, servers, or other devices communicably coupled to network 148, including those not illustrated in FIG. 1A. In the illustrated environment, the network 148 is depicted as a single network, but may be comprised of more than one network without departing from the scope of this disclosure, so long as at least a portion of the network 148 may facilitate communications between senders and recipients. In some instances, one or more of the components associated with the business network coordinator system 103 may be included within the network 148 as one or more cloud-based services or operations.

The network 148 may be all or a portion of an enterprise or secured network, while in another instance, at least a portion of the network 148 may represent a connection to the Internet. In the illustrated example, at least a portion of the network 148 includes a portion of a cellular or mobile data network or other network capable of relaying SMS messages. In some instances, a portion of the network 148 may be a virtual private network (VPN). Further, all or a portion of the network 148 can comprise either a wireline or wireless link. Example wireless links may include 802.11a/b/g/n, 802.20, WiMax, and/or any other appropriate wireless link. In other words, the network 148 encompasses any internal or external network, networks, sub-network, or combination thereof operable to facilitate communications between various computing components inside and outside the illustrated environment 100. The network 148 may communicate, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1A, the business network coordinator system 103 includes a processor 109. Although illustrated as a single processor 109 in the business network coordinator system 103, two or more processors may be used in the business network coordinator system 103 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the business network coordinator system 103 and, specifically, the functionality associated with the corresponding business application 120 and the on-demand platform 130. In one implementation, the server's processor 109 executes the functionality required to receive and respond to requests and instructions from the tenants A 175a and B 175b, as well as the functionality required to perform the operations of the associated business application 120 and the on-demand platform 130, among others.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1A are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding on-demand platform 130 and the business application 120 stored on the associated business network coordinator system 103. In some instances, a particular business network coordinator system 103 may be associated with the execution of two or more business applications 120 (and other related components), as well as one or more distributed applications executing across two or more servers executing the functionality associated with the business network coordinator system 103.

At a high level, each business application 120 is any application, program, module, process, or other software that may execute, change, delete, generate, or otherwise manage information associated with a particular business network coordinator system 103, and in some cases, a business process performing and executing business process-related events. In particular, business processes communicate with other users, applications, systems, and components to send, receive, and process events. In some instances, a particular business application 120 may operate in response to and in connection with one or more requests received from an associated tenant A or other remote client. Additionally, a particular business application 120 may operate in response to and in connection with one or more requests received from other business applications 120 external to the business network coordinator system 103. In some instances, the business application 120 may request additional processing or information from an external system or application. In some instances, each business application 120 may /represent a web-based application accessed and executed by remote tenants A 175a and/or B 175b via the network 148 (e.g., through the Internet, or via one or more cloud-based services associated with the business application 120). Further, while illustrated as internal to the business network coordinator system 103, one or more processes associated with a particular business application 120 may be stored, referenced, or executed remotely. For example, a portion of a particular business application 120 may be a web service that is remotely called, while another portion of the business application 120 may be an interface object or agent bundled for processing at a remote system (not illustrated) or a particular tenant A 175a or B 175b (e.g., the application on platform 184a-b). Moreover, any or all of a particular business application 120 may be a child or sub-module of another software module or enterprise application (not illustrated) without departing from the scope of this disclosure. Still further, portions of the particular business application 120 may be executed or accessed by a user working directly at the business network coordinator system 103, as well as remotely at corresponding tenants A 175a and B 175b.

The illustrated business application 120 may be created and developed based on an underlying software platform or platform layer, which can be used to provide functionality defined by the platform, as well as additional functionality available by building software applications upon the platform layer using components and entities designed or adapted for use with the platform. By creating the additional functionality, the platform can be extended and added to by a plurality of developers, providing for a fluid means of enhancement. In some instances, additional applications can be built on top of the original system by many different developers and development teams to create new products and software. The on-demand platform 130 and its corresponding consolidated on-demand platform can maintain a metadata repository storing information on the various models and their associated definitions and metadata across an entire development ecosystem, while the on-demand platform 130 may be used on which to create or to base newly developed applications.

Figure 1B:
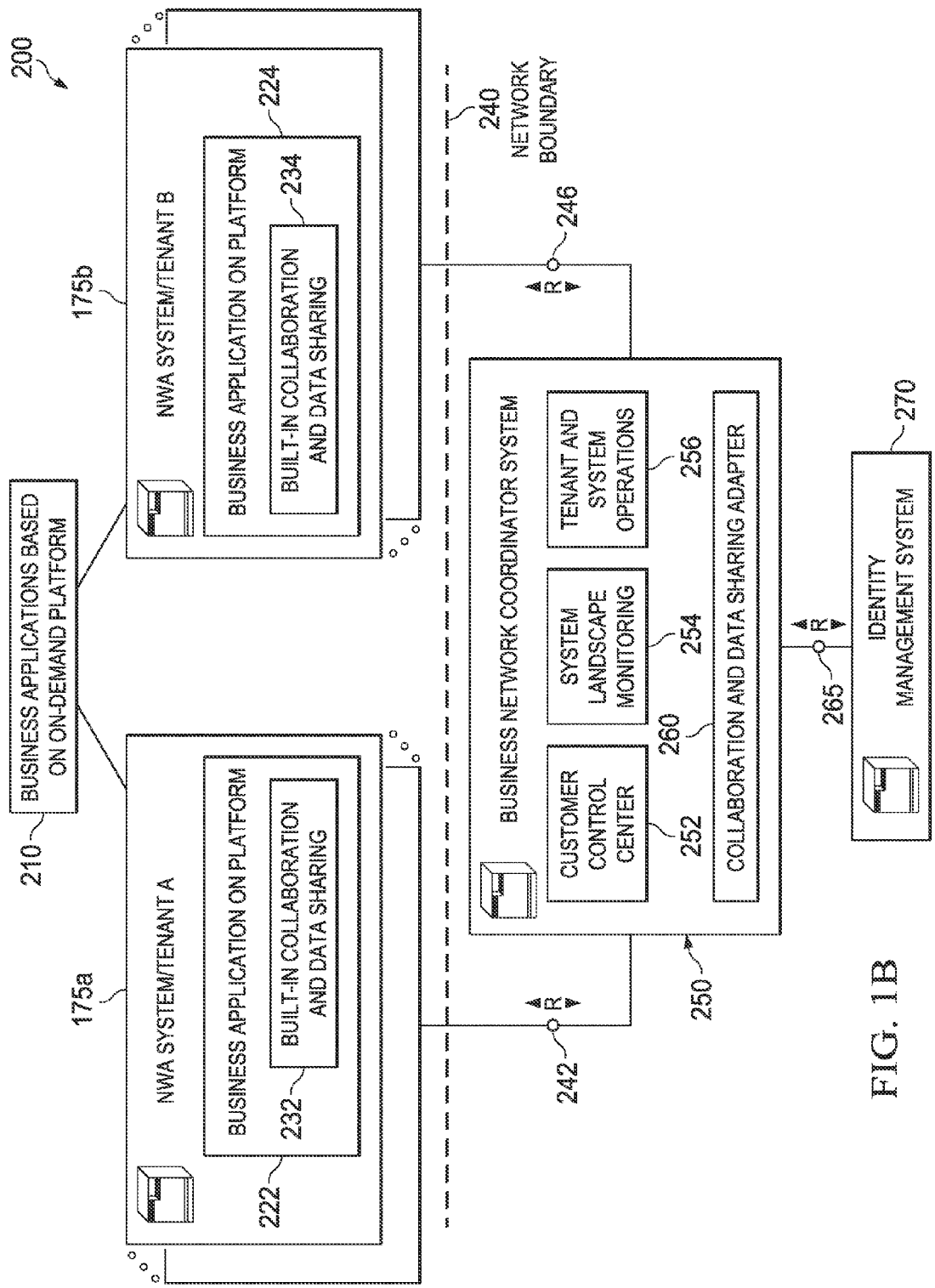
FIG. 1B is a more detailed illustration of an example system for business network establishment.

The on-demand platform 130 may include multiple components of functionality, including those illustrated in example FIG. 1A, as well as those illustrated in example FIG. 1B. For example, the on-demand platform 130 of FIG. 1A includes three components, a customer control center 132, a system landscape monitor 136, and a tenant and system operation manager 138. In general, the customer control center 132 provides one or more application programming interfaces (APIs) to the tenants A 175a and B 175b for accessing the operations of the on-demand platform 130 remotely. In some instances, use of one or more APIs at the Customer control center 132 can allow for pre-publishing of one or more models to and/or from the business network coordinator system 103 of FIG. 1A.

The customer control center 132 allows tenants, such as the tenants A 175a and B 175b, access to the on-demand platform 130, and vice versa. The customer control center 132 may include a graphical user interface for selection of administration tools. For example, the tenants may monitor system health, retrieve system information, execute maintenance program, analyze system performance, improve execution procedure, organize files and information, and perform other control tasks via the customer control center 132. In some aspects, the customer control center 132 enables collaboration functionalities when tenants, such as the tenants A 175a and B 175b, access and operate on the on-demand platform 130 via the customer control center 132.

The system landscape monitor 136 can monitor operations, modules, and activities of the business network coordinator system 103, as well as those systems associated with the business network coordinator system 103, including the tenants 175a, b and other systems and applications. The system landscape monitor 136 may be accessed by tenants such as the tenants A 175a and B 175b to access the published registry data and collaboration content. Further details regarding the communication between the system landscape monitor 136 and the tenants will be descried in detail in FIG. 1B. In some implementations, the system landscape monitor 136 can collect and present a list of active tenants using the on-demand platform 130. The system landscape monitor 136 may categorize the active tenants by areas of business, technology, market orientation, and other aspects of the tenants. In some implementations, the system landscape monitor 136 can show resource distribution or allocation or both within the business network coordinator system 103 and enable administrators or tenants with administrator rights to modify and improve the resource distribution or allocation or both.

The tenant and system operation manager 138 supports communications between tenants, such as tenants A 175a and B 175b and the business network coordinator system 103. The tenant and system operation manager 138 can manage central instances of network establishments between tenants and enable the business network coordinator system 103 to monitor the network upon establishment agreement from all participants. For example, tenant A 175a may publish certain data to the business network coordinator system 103. Tenant B 175b may receive the published data registry and send an invitation, or request that an invitation be sent, to the tenant A 175a to establish a business network. The tenant and system operation manager 138 enables these operations performed by the tenants A 175a and B 175b. If tenant A 175a accepts the invitation from tenant B 175b, then a business network can be established between tenant A 175a and tenant B 175b.

FIG. 1A further includes memory 112. The memory 112 of the business network coordinator system 103 stores data and program instructions, as well as metadata associated with the on-demand platform 130. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects, object models, and data, including classes, frameworks, applications, backup data, business objects, jobs, web pages, web page templates, database tables, process contexts, repositories storing services local to the business network coordinator system 103, and any other appropriate information including any parameters, variables, algorithms, instructions, rules, constraints, or references thereto associated with the purposes of the business network coordinator system 103 and its functionality. In some implementations, including in a cloud-based system, some or all of the memory 112 may be stored remote from the business network coordinator system 103, and communicably coupled to the business network coordinator system 103 for usage. As described above, memory 112 can include one or more metamodels associated with various objects included in or associated with the underlying platform. Specifically, memory 112 can store items and entities related to the on-demand platform 130 and/or other collaboration-related entities or components. Some or all of the elements illustrated within memory 112 may be stored external to the memory 112. These items may be made accessible to the on-demand platform 130 as illustrated in FIG. 1B.

The memory 112 includes several components associated with a collaboration and data sharing adapter 115 (illustrated external to memory 112), which includes registry collaboration models 118, registry 119, on-demand modules 121, and database 124. The collaboration and data sharing adapter 115 enables tenants to publish and search shared registry data. For example, the tenants using the shared on-demand platform 130 have access to the embedded functionality for collaboration, data-sharing and network establishment. The tenants that are willing to participate in network establishment can select so and automatically publish their data via the registry collaboration models 118 in the collaboration and data sharing adapter 115. When some tenants search for collaboration partners, they can send or receive invitation for data sharing and collaboration by other tenants. The registry collaboration models 118 identify the tenants that agree to a business network establishing relationship.

The on-demand modules 121 in the memory 112 may include various functionalities of the business network coordinator system 103, and can be selectively provided to some or all of the tenants. As previously described, the on-demand modules 121 in the business network coordinator system 103 may include CRM, FM, PM, SCM, SRM, HRM, EMS, CM, and others. For example, tenant A 175a may request services of a subset of the on-demand modules 121 from the application on platform 184a, such as CRM, HRM, and EMS. Tenant B 175b may request a different subset of the on-demand modules 121 on the application platform 184b, such as FM, HRM, and EMS.

The shared data created by both the tenants A 175a and B 175b can be stored at the database 124, while the on-demand modules 121 remain standard to the on-demand platform 130. As part of SaaS, the database 124 may provide secure, efficient and reliable performance to the tenants. The tenants may specify a certain portion of data to be published in the registry and shared in the business network coordinator system 103. The registry collaboration models 118, the on-demand modules 121 and the database 124 enable the collaboration and data sharing adapter 115 to supply a frame work for different tenants to publish and search data as well as establish tenant-to-tenant network, without requirement of a central website or server.

The illustrated environment 100 of FIG. 1A also includes one or more tenants A 175a and B 175b. The tenants A 175a and B 175b may be associated with a particular business application or development context, as well as a particular platform-based application system. Each tenant A 175a and B 175b may be any computing device operable to connect to or communicate with at least one of the business network coordinator system 103 using a wireline or wireless connection via the network 148, or another suitable communication means or channel. In some instances, the tenants A 175a and B 175b may be a part of or associated with a business process involving one or more of the business applications 120, or alternatively, a remote developer of associated with the platform or a related platform-based application. In general, each tenant A 175a and B 175b includes a processor 181a-b, an interface 178a-b, an application on platform 184a-b, a graphical user interface (GUI) 190a-b, and a memory 187a-b. In some instances, tenants A 175a and B 175b may be located on a single server in a co-tenancy environment. In those instances, the tenants 175a, b may share some or all of the resources of the server to perform their corresponding operations. In general, the tenants A 175a and B 175b comprise electronic computer devices operable to receive, transmit, process, and store any appropriate data associated with the environment 100 of FIG. 1A. It will be understood that there may be any number of tenants A 175a and B 175b associated with, or external to, environment 100. For example, while illustrated environment 100 includes two tenants A 175a and B 175b, alternative implementations of environment 100 may include multiple tenants communicably coupled to the one or more of the systems illustrated. In some instances, one or more tenants A 175a and B 175b may be associated with administrators of the environment, and may be capable of accessing and interacting with the settings and operations of the on-demand platform 130, one or more business applications 120, a particular application development module, and/or other components of the illustrated environment 100. Additionally, there may also be one or more additional tenants A 175a and B 175b external to the illustrated portion of environment 100 capable of interacting with the environment 100 via the network 148. Further, the terms "tenant," "client," "customer," and "user" may be used interchangeably as appropriate without departing from the scope of this disclosure. Moreover, while each tenant A 175a and B 175b is described in terms of being used by a single user, this disclosure contemplates that many users may use one computer, or that one user may use multiple computers. In general, tenants may usually belong to one customer or company. Several employees of the customer, called users, can use the applications deployed on the corresponding tenant. For instance, the term "tenant" refers to a system providing a set of business applications belonging to or rented by a particular customer or business entity. Several employees of that particular customer or business entity can be users of that tenant and use the business applications provided by or available on this tenant.

The GUIs 190a-b associated with each tenant A 175a and B 175b may comprise a graphical user interface operable to, for example, allow the user of a tenants A 175a and B 175b to interface with at least a portion of the business application 120, the on-demand platform 130, and their associated operations and functionality. Generally, the GUI 190a-b provides the particular user with an efficient and user-friendly presentation of business data provided by or communicated within the system. The GUI 190a-b may comprise a plurality of customizable frames or views having interactive fields, pull-down lists, and buttons operated by the user. For example, the GUI 190a-b may provide interactive elements that allow a user to interact with a particular component within and/or external to environment 100. Different portions of the corresponding component's functionality may be presented and accessible to the user through the GUI 190a-b, such as through an application on platform 184a-b (e.g., a web browser). Generally, the GUI 190a-b may also provide general interactive elements that allow a user to access and utilize various services and functions of a particular component. In some instances, the application on platform 184a-b may be used to access various portions of different platform-based application systems or the business network coordinator system 103. In some instances, the application on platform 184a-b may be an agent or client-side version of the business application 120 or other suitable component. The GUI 190a-b may present the information of the application on platform 184a-b for viewing and interaction. In general, the GUI 190a-b is often configurable, supports a combination of tables and graphs (bar, line, pie, status dials, etc.), and is able to build real-time portals, where tabs are delineated by key characteristics (e.g., site or micro-site). Therefore, the GUI 190a-b contemplates any suitable graphical user interface, such as a combination of a generic web browser, intelligent engine, and command line interface (CLI) that processes information in the platform and efficiently presents the results to the user visually.

As used in this disclosure, each tenant A 175a and B 175b is intended to encompass a personal computer, touch screen terminal, workstation, network computer, kiosk, wireless data port, smart phone, personal data assistant (PDA), one or more processors within these or other devices, or any other suitable processing device. For example, each tenant A 175a and B 175b may comprise a computer that includes an input device, such as a keypad, touch screen, mouse, or other device that can accept user information, and an output device that conveys information associated with the operation of one or more business applications 120, on-demand platforms 130, and/or the tenants A 175a and B 175b itself, including digital data, visual information, or the GUI 190a-b. Both the input and output device may include fixed or removable storage media such as a magnetic storage media, CD-ROM, or other suitable media, to both receive input from and provide output to users of tenants A 175a and B 175b through the display, namely, the GUI 190a-b. The tenants' processors 181a-b, interfaces 178a-b, and memories 187a-b may be similar to or different from those described in connection with the other components illustrated in FIG. 1A, although alternative implementations of one or more of these components may be used, as well as implementations where additional components may also be included.

The applications on platform 184a-b may comprise applications based on the common platform for coordinating the described business network. As illustrated in FIG. 1A, tenants A 175a and B 175b respectively contain a built-in collaboration and data sharing system, for example, the built-in collaboration and data sharing system 185 of tenant A 175a. The built-in collaboration and data sharing system 185 may further include components such as a discovery manager registry 192, a business network builder 194, and business network coordinator agents 196. The discovery manager registry 192 enables tenant A 175a to find available shared data in the registry. The business network builder 194 enables the tenant A 175a to establish a business network after the tenant A 175a discovers useful shared data. For example, the discovery manager registry 192 may access published shared data in the business network coordinator system 103.

In some instances, the discovery manager registry 192 may actually collect published shared data and/or metadata describing a set of shared data for inspection at the corresponding tenant, allowing each tenant to view the set of information available for sharing and collaboration. Tenant A 175a can send invitations via the business network builder 194 to other tenants of which the shared data are discovered by the tenant A 175a. If the invited tenant accepts the invitation, a business network between the two tenants can then be established. The business network coordinator agents 196 can enables various components to work with central collaboration capabilities to allow for sharing. The Although in FIG. 1A only one built-in collaboration and data sharing system is shown, in some instances, every tenant may include an application based on the on-demand platform having a built-in collaboration and data sharing system.

FIG. 1B is a more detailed illustration of an example system 200 for business network establishment. The example system 200 can be one specific and/or alternative implementation of the example environment shown in FIG. 1A, with clear flow of registry data and collaboration control illustrated. In FIG. 1B, the example system 200 may include the tenants A 175a and B 175b of the example environment 100. The tenants A 175a and B 175b are using business applications 210 based on the on-demand platform, such as the on-demand platform 130 of the business network coordinator system 103 in FIG. 1A. In some implementations, the business applications 210 can include multiple functionalities and modules. For example, the business applications 210 may include CRM, FM, PM, SCM, SRM, HRM, EMS, CM, and others.

Each of the tenants A 175a and B 175b includes a business application on platform 222 and 224. The business application on platform 222 and 224 can be realized on a web browser running on a remote computer. As an end user of an SaaS, the tenants A 175a and B 175b can access various modules of the business applications 210 without previous local installation of the business applications 210, as components of the business application on platforms 222 or 224 can be downloaded based on the demand of the tenant A 175a and B 175b. The business application on platforms 222 and 224, as illustrated, include built-in collaboration and data sharing 232 and 234. The built-in collaboration and data sharing 232 and 234 locally determines data publication and discovery in the tenants A 175a and B 175b. For example, tenant A 175a may access a registry (as illustrated by 242) across a network boundary 240 to communicate registry data and collaboration content. The registry data and collaboration content may reach the business network coordinator system 250 that is similar to the business network coordinator system 103 in FIG. 1A. The business network coordinator system 250 may include several components to manage the registry data and collaboration content.

In some implementations, the business network coordinator system 250 may include a customer control center 252, a system landscape monitoring 254, a tenant and system operations 256, and a collaboration and data sharing adapter 260. The tenant A 175a can publish and share some data with the tenant B 175b by providing certain access to the shared data via the business network coordinator system 250. The access can be provided via different channels and entities provided by the platform, for example, a user interface view, web services, core services of business object, report, etc. The tenant B 175b can be connected to the business network coordinator system 250 as a potential collaboration partner. The exact released and accessible data are defined and controlled via a user authorization mechanism provided via the on-demand platform on which the business applications 210 are based. The business network coordinator system 250 may include the on-demand platform as illustrated in FIG. 1A. For example, a user of the tenant B 175b can be provided access to at least a portion of the information stored at and owned by tenant A once a business network of data sharing is established between tenant A 175a and tenant B 175b. A functional- and instance-based authorization module, which is part of the on demand platform 130, can ensure that users can access only the data published as shared data, where the particular user is authorized to view the shared data. The shared data and services can be managed centrally via the collaboration and data sharing work center provided in the business applications 210.

In some implementations, tenants using an on-demand platform can access an on-demand platform registry, which can show other tenants that are using the same on-demand platform and have agreed to publish certain information in the on-demand platform business network that is supported by the business network coordinator system 250. The tenants can use standard search and browsing functions and retrieve header information entered by the tenants as they publish the information in the on-demand platform registry. For example, tenant A 175a publishes registry data (as illustrated by 242), where the registry data is managed by the business network coordinator system 250. The collaboration and data sharing adapter 260 of the business network coordinator system 250 can allow tenants to send explicit invitation for collaboration or data-sharing to one or several other tenants founded in the registry. If invited tenants accept the invitation, a relationship between both tenants can be established and both tenants can be shown as collaboration partners. For example, the business network coordinator system 250 may replicate metadata models and propagate authorizations (as illustrated by 246) that connect to tenant B 175b. In some instances, metadata models provided to the business network coordinator system 250 can be replicated to at least a portion of the built-in collaboration and data sharing systems 232, 234, such that those systems have relevant information on the data and information shared by the other users/entities/applications related to potential collaboration. The tenants A 175a and B 175b can form a business network via the business network coordinator system 250.

Until the business network is established via the business network coordinator system 250, the collaborating tenants may not access each other's data or share information except, in some instances, standard header information entered in the on-demand platform registry and published by the tenants. The on-demand platform registry can have access to the data collected by the business network coordinator system 250 that performs as a central component to allow monitoring and administration operations associated with connected tenants.

The business network coordinator system 250 can connect to an identity management system 270 via a registry connection 265. The identity management system 270 enables the customer control center 252 to recognize tenants and provide related information for operation monitoring. The business network coordinator system 250 may further include registry collaboration models and on-demand modules that are similar to those illustrated in FIG. 1A.

Figure 2:
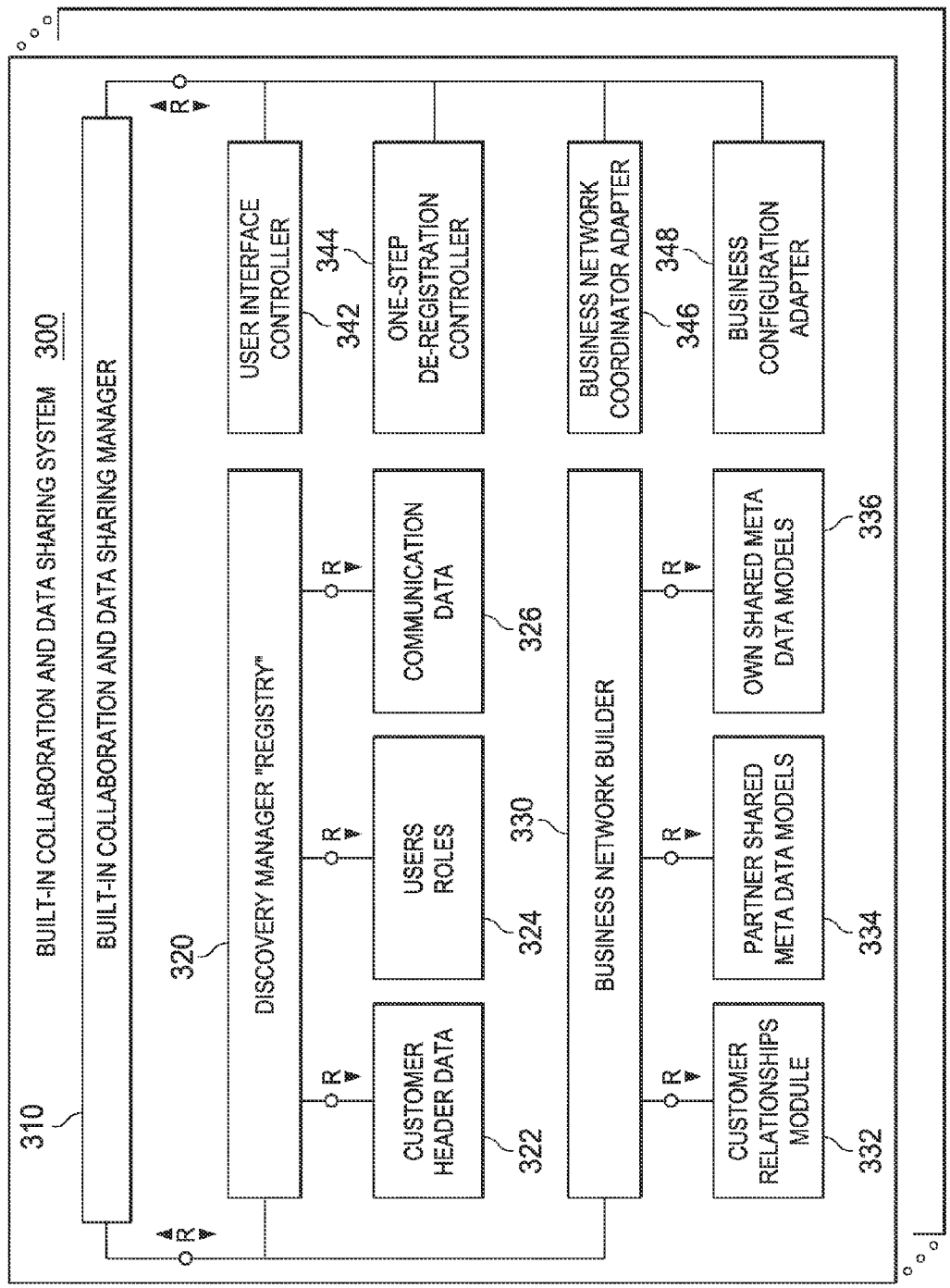
FIG. 2 provides an example illustration of a built-in collaboration and data sharing system.

FIG. 2 provides an example illustration of a built-in collaboration and data sharing system 300. The built-in collaboration and data sharing system 300 is a part of the on demand platform 130 and may be installed in each tenant such as the tenants A 175a and B 175b in FIG. 1A. The built-in collaboration and data sharing system 300 includes a built-in collaboration and data sharing manager 310, a discovery manager 320 (i.e., the registry), a business network builder 330, and several additional controllers and adapters. The built-in collaboration and data sharing manager 310 can be in communication with the discovery manager 320 and the business network builder 330. The discovery manager 320 can access customer header data 322, users roles 324, and communication data 326.

In some implementations, the customer header data 322 includes header entries such as a title, an overall description, a registration name, and other summary labels input by a tenant who has created the entry. The customer header data 322 may have been published by default to the on-demand platform network by tenant usage agreements. The users roles 324 can define who has access to view the registry information and who can interact with the collaboration data. For example, if it has been defined by one company that any user at another particular company can look at the registered information, and a user has signed on for the company, the user can automatically be granted access to the collaboration data. In some instances, the user roles may be defined by a particular user's role within the collaboration partner, such as instances where only users meeting a particular role (e.g., technical expert, manager, etc.) within the collaboration partner's organization can access or view the collaboration data. The users roles 324 can be examined by the discovery manager 320, as accessible by other tenants on the on-demand network. The communication data 326 represents data published by tenants. The communication data 326 may be a subset of tenants' data that is shared for collaboration. For example, the communication data can be the contact information, such as phone number, email address, fax number, IP address, password information, or any other suitable communication information. The communication data 326 can be accessed by the discovery manager 320 which transfers the communication data 326 and/or an overall description of the communication data 326 to the built-in collaboration and data sharing manager 310.

The business network builder 330 can access customer relationships module (including users) 332, partner shared metadata models 334, and own shared metadata models 336. The business network builder 330 can enable the tenant to invite and receive other partner tenants. The customer relationships module 332 identifies relationships between the hosting tenant and other tenants, or customers. The customer relationships module 332 includes information about users, tenants/customers, and their relationships. The partner shared metadata models 334 may include existing partner shared metadata models, such as metadata obtained from existent business networks, or data sharing, or collaboration. The metadata models can include models defining the content that is being shared and the related registry information, allowing collaboration partners and their systems to be able to interpret and understand the shared data. The own shared metadata models 336 includes own shared metadata models that are published for collaboration purposes. collaboration The own shared metadata models 336 are published to the on-demand network registry and can searched by other tenants after establishing a collaboration relationship.

The built-in collaboration and data sharing manager 310 can further interface with a user interface controller 342, a one-step de-registration controller 344, a business network coordinator adapter 346, a business configuration adapter 348. The user interface controller 342 enables tenant to interact with the discovery manager 320 and the business network builder 330 by providing an appropriate user interface and related controls for viewing and interacting with the corresponding data and information. The one-step de-registration controller 344 allows tenants to use one-step de-registration to escape from an established business network. The business network coordinator adapter 346 allows the built-in collaboration and data sharing manager 310 to couple with a business network coordinator system, such as the business network coordinator system 103 in FIG. 1A. The business configuration adapter 348 enables tenants to scope in and configure the collaboration and data sharing features in the same way as business data and business processes applications are scoped in and configured using the business configuration and scoping engine, which is part of the on demand platform infrastructure.

The one-step de-registration controller 344 enables customers who registered themselves as collaboration partners or who already have established collaboration and data-sharing relationships with other customers to de-register themselves in a one-step approach. When customers de-register themselves, the associated header information can be removed immediately from the registry and can no longer be browsed. In addition, all established relationship with other customers/tenants can be removed immediately. The associated replicated metadata models to the systems of the collaboration partners can be removed and the same for the access authorizations granted to other collaboration users. Users can be notified automatically and informed about the removed access rights and/or terminating data-sharing. A similar mechanism as the one-step de-registration can be used when a tenant or customer removes an established relationship. Metadata models and granted authorizations can be removed and the data-sharing can be terminated.

In some implementations, after a collaboration and data-sharing relationship is established between two tenants, further procedures may be required and/or used to provide explicit data-sharing and data access. The collaboration user of a tenant such as the tenant A 175a of FIG. 1A can provide access to other users of the tenant B. For example, a user of the tenant B 175b can be selected so that a specified access to data of the tenant A 175a can be provided, such as when users of tenant B 175b are only visible to the tenant A 175a after establishing a business network or collaboration relationship in-between. Corresponding access authorizations can also be assigned by pointing about the relevant development entity instances, such as assigning work center views, assigning reports, assigning business object core services, and assigning interfaces. For instance, if tenant A 175a (or its users) want to share the information about scheduled production orders with a specific user of tenant B 175b, then the report listing all scheduled open production orders, which is usually used by the user of Tenant A 175a, can be provided/assigned also to tenant B 175. Once the report is provided to tenant B 175b, the users of tenant B 175b may be able to access this report and see the list of the scheduled open ordered in tenant A 175a (if they have the corresponding authorization/access rights). After assigning or providing the report to tenant 175b, the appropriate authorizations can be given to the users of tenant B 175b having the appropriate roles defined in users roles modules 342. Because both tenants are using the same on-demand platform development infrastructure, the report can be provided from one tenant to other by passing the model presenting this report (in our example report model). The model can be integrated in the applications of the receiving tenant, and the data associated with the model can be retrieved via one or more remote access requests or communications with the publishing tenant. The shared models between tenants are not restricted to reports, but could be from different categories, including but not limited to work centers (collections of screens/reports), business objects (e.g., objects exposing business data via standardized services), and other suitable types.

In some implementations, the business network establishment may require or use single sign-on capability of the on-demand platform. For example, the single sign-on enables users of collaboration tenants to access each other's data and tenant without the need for logging on or authenticating themselves more than once. In addition, the generic user mapping capability can allow to consider the user of the collaboration tenant in the same manner like the own users. The user mapping can be using a central identity management system available in the on-demand platform system landscape, such as the identity management system 140 shown in FIGS. 1A and 1B.

In some implementations, the corresponding user interface elements (e.g., reports, floor plans) and web services related to such data need to be assigned to a collaboration work center view. As such a collaboration view is created; the Work center view can be assigned to the users of the collaboration partner. The user can get authorization to access the data following the authorizations mechanism provided by the on-demand platform. After assignment of the collaboration work center view to the end user of the collaboration partner, the metadata models of those work center and the related entities are replicated to the tenant of the collaboration partner, and the work center view is assigned in the collaboration partner tenant to the end user. In an on-demand platform development infrastructure example, users' data access rights and authorizations are defined by means of a work center and work center views, following an authorization and viewing principle of "what you see and what you can do are what you authorized to see and to do."

To access data of collaboration partner, the end user can call or display the collaboration work center and choose one of the collaboration partner. The corresponding metadata models and models that were previously provided to the end user, when the collaboration partner defined the data to be shared, are shown or provided (e.g., a list showing open production orders in the tenant of the collaboration partner). A connection to the corresponding system or tenant can be provided. Once provided, the corresponding data can be retrieved and presented. For example, the user interface engine is able to open several connections to different systems or tenants at the same time. A correct URL and metadata model can be replicated after the authorization assignment is created by a customer/tenant that wants to share data with a collaboration partner. The assignment and scope of shared data can be completed in a flexible manner by the customer/tenant who elects to share the data with the collaboration partner.

The collaboration and data sharing capabilities of the built-in collaboration and data system 300 can be integrated with the on-demand platform business configuration engine, which can be part of the built-in collaboration and data sharing manager 310. The business configuration engine can support business adaptation catalog and fine tuning Customers intending to share data with other collaboration tenants can scope in the collaboration functionality after adding the header information published in the registry. Other customers may browse for collaboration tenants for potential collaboration partners. Scoping in the collaboration functionality can lead to the deployment and activation of a collaboration work center. In addition, fine tuning activities can be added such that each customer can enter users that can share data with other collaboration tenants. For example, the email address and the business roles of those users can also be published to the collaboration tenants when a business network relationship is established.

Figure 3:
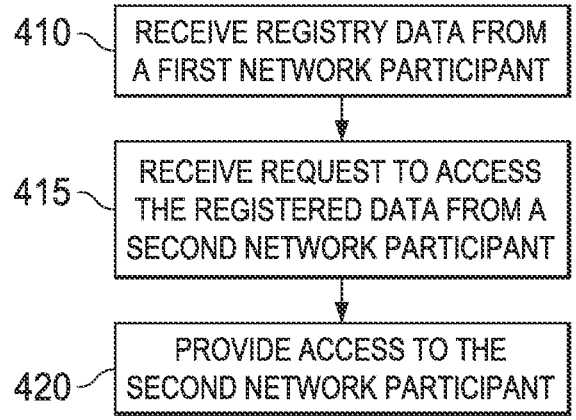
FIG. 3 illustrates an example method for establishing a business network from a system perspective.

FIG. 3 illustrates an example method 400 for establishing a business network from a system perspective. The method 400 can be used in a system such as the business network coordinator system 103 as shown in FIG. 1A. The business network coordinator system 103 plays the coordinator role in a system's interconnections. In the present example, the different systems/tenants are using the same on-demand platform technology (which include, among other functions, a collaboration and data sharing capability) and the same infrastructure, and are managed together. This enables the building a of systems/tenants interconnection. Before the systems/tenants interconnection is built, the different systems/tenants know only one single system. This system, in the illustrated examples, is the network coordinator system 103 described in FIG. 1. The method 400 describes, at a high level, the relationships between participants and the system. At 410, the system receives registry data from a first network participant, such as the tenant A 175a of FIG. 1A. The registry data may include header information describing data content, attributes, and formats. At 415, the system may then receive request to access the registered data from a second network participant, such as the tenant B 175b of FIG. 1A. The system may automatically grant access to the second network participant if the registry data has been assigned generally available to the public. In some instances, the available information regarding the second network participant may be limited to the name of a particular customer or tenant, allowing potential collaboration partners to identify particular potential partners. At 420, the system can provide access to the second network participant for the registered data under certain conditions that enable an establishment of a collaboration network. Details of the granting process are described in the following methods.

Figure 4:
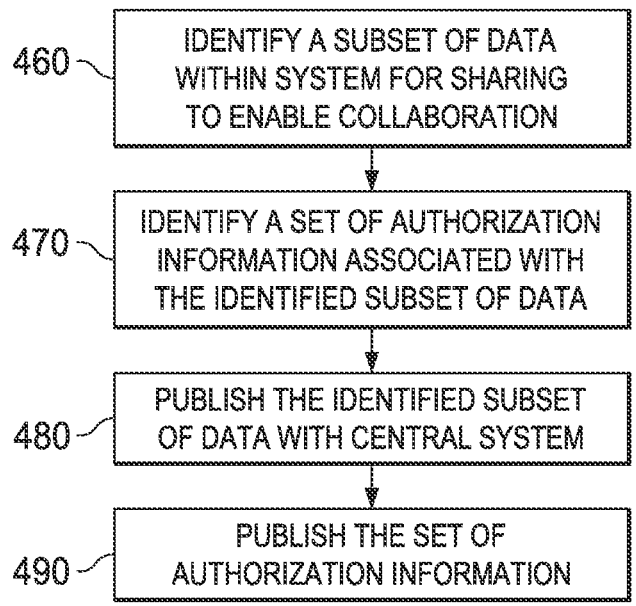
FIG. 4 illustrates an example method for sharing data on the business network from a user perspective.

FIG. 4 illustrates an example method 450 for sharing data on the business network from a user perspective. A user can be user of a tenant such as the tenants A 175a or B 175b of FIG. 1A. At 460, the user can first identify a subset of data within their on-demand platform tenant for sharing to enable collaboration. The user then can identify a set of authorization information associated with the identified subset of data at 470. This can include identifying which roles a user should have to be able to access the shared data. The authorization information may include certain attributes defining the audience and security level for the shared data. For example, the audience for shared data may be limited to persons in a particular role, such as manager. At 480, the user can publish the identified subset of data with a central system. The central system can be the business network coordinator system 103 shown in FIG. 1A. The publication process may involve sending data information to a registry such as the discovery manager 320 of FIG. 2. The user may then, at 490, publish the set of authorization information to share the information with other potential collaborators. The identified shared data can be also specified for a specific collaboration partners and routed to them directly via the business network coordinator system 103. That means the identified subset of data to be shared may also be collaboration partner-dependent. Also, the user authorizations may be given explicitly to a user of the collaboration partner. In some instances, there may be options when sharing a user's own business data. In one instance, own shared data can be published explicitly to a particular collaboration partner, with particular authorizations explicitly provided to different users and roles of the particular collaboration partner. In a second sharing instance, data to be shared similar to header information provided to identify collaboration partners. The data to be shared can be defined once for all potential collaboration partners, with the model definition being published to the business network coordinator system 103. Authorizations can be provided generically to the system 103, such as based on particular defined roles of various users.

FIG. 5 illustrates an example method 500 for obtaining shared data on the business network from a user perspective. A user may first receive information on a set of possible collaboration partners at 510. The information may be available as an embedded function of the shared on-demand platform. The user can then, at 520, identify a particular partner for collaboration from the set. At 530, the user can request collaboration with the identified partner by sending invitations to the identified partner. The invitation may be carried though a central system such as the business network coordinator system 103 of FIG. 1A via a network similar to the network 148. At 540, the identified partner can respond to the invitation. If the identified partner rejects the invitation, then the user receives a notification of the rejected collaboration at

545. If the identified partner accepts the invitation, then the user receives the collaboration content via the business network coordinator system at 550. In some instances, content may be limited to metadata models which are to be integrated into the application of the receiving tenant and provided to its users. The description of FIG. 5 relates to implementations or instances where the publishing tenant defines the shared data as collaboration partner-independent. In such a case, all tenants having established a collaboration relationship with the publishing tenant may have access to the shared data. Users in the collaboration partner tenant are then automatically granted access depending on their defined roles. In some instances, the publishing tenant can define particular collaboration partners to allow at 540, or be provided the ability to approve or deny requested collaborations. At 560, the tenant receives meta-models defining the collaboration partner's shared data, as well as the corresponding authorization information. At 570, access is provided to the shared data. In some instances, the received metadata models can be integrated in the receiving tenant's applications, and can be assigned to the work center of users authorized to view the shared data. Additionally, the meta-models and/or related information can define and/or include connection information, such as a URL associated with the shared data of the publishing tenant. The URL associated with the shared data of the publishing tenant is propagated to the receiving tenant's application's run time engine (i.e., a part of on demand platform technology and infrastructure). When the user opens the collaboration work center to access the shared data, the runtime engine can perform a remote call to the publishing tenant to access and retrieve the shared data from the publishing tenant.

FIG. 6 illustrates an example method 600 for receiving new collaboration data on the business network from a system perspective. The system can be a central system similar to the business network coordinator system 103 as illustrated in FIG. 1A. At 610, the system can identify request from a business application of the on-demand platform to join the collaboration system by sending information to a registry. The registry may include information such as customer header data, user roles, communication data, and other data types. At 620, the system can identity meta-models defining collaboration content from business application. At 630, the system can identify authorizations associated with the identified meta-models, such as permissions granted to certain participants. At 640, the system can centrally store meta-models and authorization information. A business application or its tenant attempting to join a collaboration network may also be able to provide scoping and business configuration decisions prior to submitting its collaboration information. In some instances, the collaboration system or tenant can use a scoping and business configuration engine including as part of the on-demand platform technology and infrastructure. Adapter 348 of FIG. 2 illustrates an example of this coupling. When a customer configures a tenant for collaboration, the customer can select, in a scoping step, which business applications and business processes are to be shared in the collaboration business network. In a second step, and in accordance with the scoping step, a fine tuning activity can be performed to provide additional configuration and collaboration information. The collaboration and configuration information can be managed by the collaboration functionality included in the on-demand system/application within the tenant. In the scoping process, therefore, the customer can decide initially if the collaboration capability will be used. The options can be modified after initial scoping, as well. If the customer elects to use the collaboration capability, the fine tuning of how and what is to be shared is selected. In the fine tuning activity, the customer can enter the information needed to facilitate the future collaboration, including header information, contact information, the collaboration users, and their roles. Additional information may include the roles or persons within a collaboration partner who can see and use the collaboration information. The information can then be transferred, via network connections, to the business network coordinator system and stored in the corresponding registry components (e.g., registry components 320 in FIG. 2).

Figure 7:
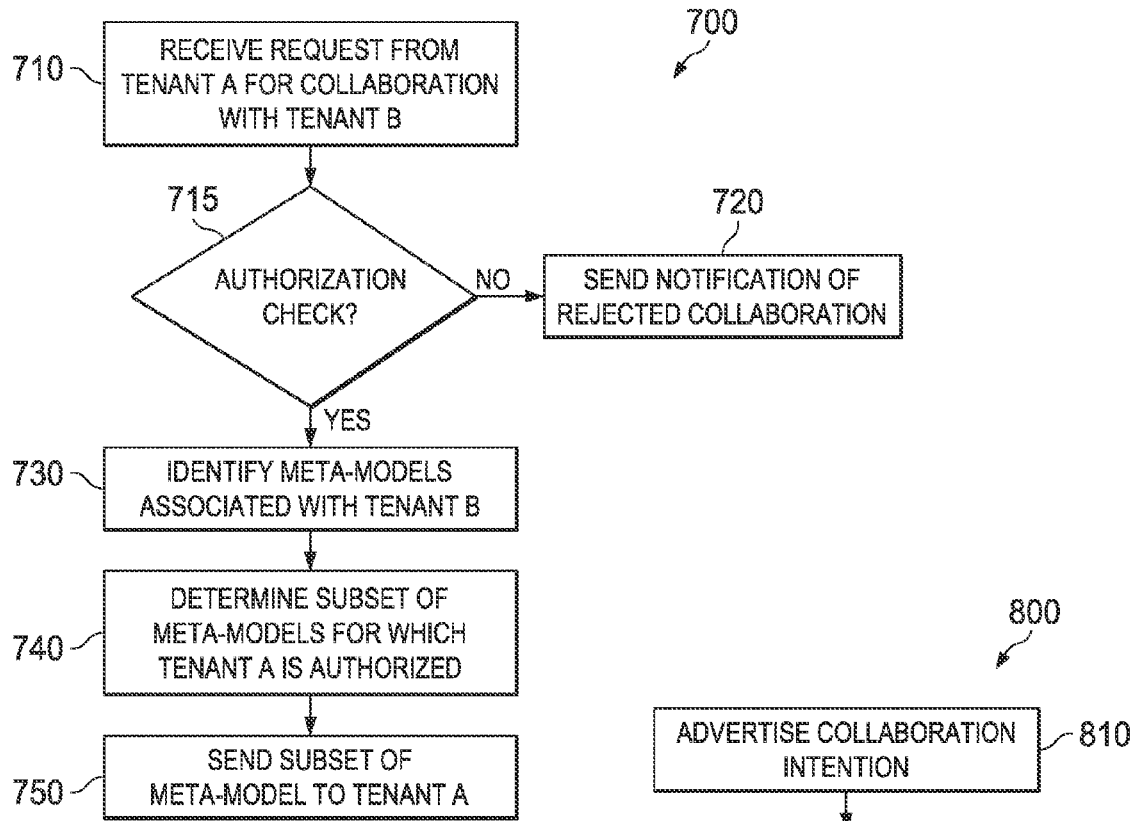
FIG. 7 illustrates an example method for sharing collaboration data on the business network from a system perspective.

FIG. 7 illustrates an example method 700 for sharing collaboration data on the business network from a system perspective. In some instances, the system can be a business network coordinator system similar to the business network coordinator system 103 as illustrated in FIG. 1A. At 710, the system receives request from tenant A for collaboration with tenant B. The tenants A and B can be similar to the tenants A 175a and B 175b of FIG. 1A. The system then checks for authorization at 715. If the request from tenant A is rejected, then the system sends notification of rejected collaboration to tenant A at 720. If the request from tenant A is granted, then the system identifies meta-models associated with tenant B at 730. Those meta-models can include reports, interfaces, or other related services defining the shared data and services and the manner with which their the shared data could be accessed. The system then determines a subset of meta-models for which tenant A is authorized at 740, and sends the subset of meta-model to tenant A at 750. This applies where the shared data associated with in tenant B is defined explicitly for a specific tenant, such as tenant A, and the authorizations associated with the shared data, including which users in tenant A shall have access to those shared data in tenant B.

Figure 8:
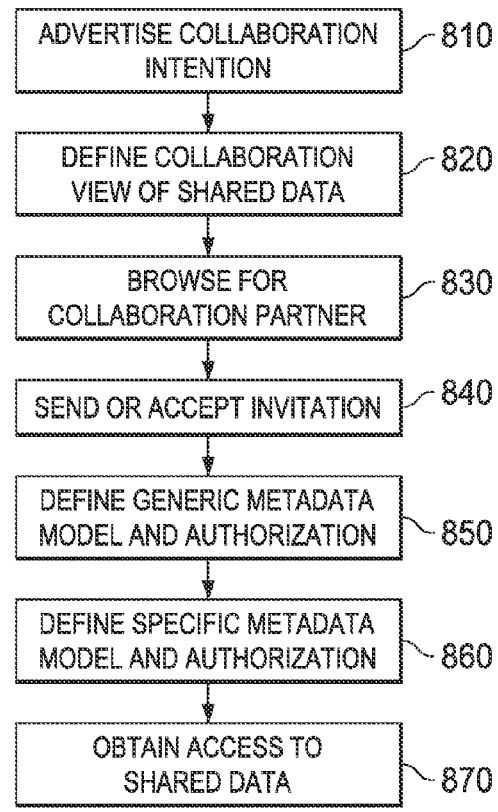
FIG. 8 illustrates an example method for post network creation on the business network from a user perspective.

FIG. 8 illustrates an example method 800 for post-network creation on the business network from a user perspective. The user can be any participant in an on-demand network system, such as a user of a client, tenant, or customer, among others. The user can be the tenant A of the method 700. At 810, the user can advertise collaboration intention. For example, the user can specify the shared data content and intention in the listed header information published in the registry of the central system (such as the business network coordinator system 103 of FIG. 1). At 820, the user can define a collaboration view of shared data that is a subset of the collection of data that a partner can view and/or interact with. At 830, the user can browse for relevant collaboration partner based on their published profiles or registry header or both. At 840, the user may send an invitation to a prospective collaboration partner based on the previous step 830, or receive and accept an invitation from other collaboration partners to establish a collaboration network. At 850, the user can define generic metadata model and authorization for all or particular collaboration partners. At 860, the user can define specific metadata model and authorization for a specific partner with whom a collaboration network has been established. At 870, the user can obtain access to the shared data from the collaboration partner and provide access for the collaboration partner to own shared data.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for establishing business network on shared usage, the method comprising:
   receiving a set of registry data associated with a collaboration system from a first network participant, wherein the set of registry data automatically publishes a set of preliminary data of each network participant, wherein the set of preliminary data includes a description of the each network participant and data related to each network participant, and wherein at least a portion of the set of registry data published in a collaboration registry is used to identify data to be shared through the collaboration system by the first network participant, the first network participant executing a first application based on a first application platform and sending invitations to one or more other network participants responsive to searching preliminary data in the collaboration registry published by the other network participants and discovering information suitable for establishing a collaborative relationship with the one or more other network participants;
   receiving a request from a second network participant to access the set of registry data from the first network participant, the second network participant executing, based on a second application platform compatible with the first application platform, on a second application; and
   providing access to the second network participant of at least a subset of data shared by the first network participant for collaboration.

2. The method of claim 1, wherein the first application platform provides an on-demand service.

3. The method of claim 1, wherein providing access to the second network participant comprises:
   identifying at least one user associated with the second network participant to provide data access with the first network participant; and
   assigning corresponding access authorizations to development entity instances associated with the at least one identified user.

4. The method of claim 3, wherein the development entity instances includes at least one of work center view, a report, a business object core service, and an interface.

5. The method of claim 3, where assigning corresponding access authorizations is based on pre-defined roles for the second network participant.

6. The method of claim 3, where assigning corresponding access authorizations is defined by the first network participant using an authorization mechanism provided by the first application platform.

7. The method of claim 1, wherein the first network participant selects a subset of information associated with the first application to share with the second network participant.

8. The method of claim 7, wherein the subset of information associated with the first application is defined via a user authorization mechanism associated with an on-demand service of the first and the second application platforms.

9. The method of claim 1, wherein receiving a set of registry data comprises publishing metadata models pre-defined by the first network participant.

10. The method of claim 1, wherein the first application platform and the second application platform are the same.

11. The method of claim 1, wherein the first application platform and the second application platform are different versions of a one application platform.

12. The method of claim 1, wherein the second application platform is derived from the first application platform.

13. A computer program product encoded on a non-transitory, tangible storage medium, the product comprising computer readable instructions for causing one or more processors to perform operations comprising:
   receiving a set of registry data associated with a collaboration system from a first network participant, wherein the set of registry data automatically publishes a set of preliminary data of each network participant, wherein the set of preliminary data includes a description of the each network participant and data related to each network participant, and wherein at least a portion of the set of registry data published in a collaboration registry is used to identify data to be shared through the collaboration system by the first network participant, the first network participant executing a first application based on a first application platform and sending invitations to one or more other network participants responsive to searching preliminary data in the collaboration registry published by the other network participants and discovering information suitable for establishing a collaborative relationship with the one or more other network participants;
   receiving a request from a second network participant to access the set of registry data from the first network participant, the second network participant executing, based on a second application platform compatible with the first application platform, on a second application; and
   providing access to the second network participant of at least a subset of data shared by the first network participant for collaboration.

14. The computer program product of claim 13, wherein providing access to the second network participant comprises:
   identifying at least one user associated with the second network participant to provide data access with the first network participant; and
   assigning corresponding access authorizations to development entity instances associated with the at least one identified user.

15. The computer program product of claim 14, wherein the development entity instances includes at least one of work center view, a report, a business object core service, and an interface.

16. The computer program product of claim 14, where assigning corresponding access authorizations is based on pre-defined roles for the second network participant.

17. The computer program product of claim 13, wherein the first network participant selects a subset of information associated with the first application to share with the second network participant.

18. The computer program product of claim 17, wherein the subset of information associated with the first application is defined via a user authorization mechanism associated with an on-demand service of the first and the second application platforms.

19. The computer program product of claim 13, wherein receiving a set of registry data comprises publishing metadata models pre-defined by the first network participant.

20. The computer program product of claim 13, wherein the first application platform and the second application platform are the same.

21. A system, comprising:
   one or more computers; and
   a computer-readable medium coupled to the one or more computers having instructions stored thereon which, when executed by the one or more computers, cause the one or more computers to perform operations comprising:
      receiving a set of registry data associated with a collaboration system from a first network participant, wherein the set of registry data automatically publishes a set of preliminary data of each network participant, wherein the set of preliminary data includes a description of the each network participant and data related to each network participant, and wherein at least a portion of the set of registry data published in a collaboration registry is used to identify data to be shared through the collaboration system by the first network participant, the first network participant executing a first application based on a first application platform and sending invitations to one or more other network participants responsive to searching preliminary data in the collaboration registry published by the other network participants and discovering information suitable for establishing a collaborative relationship with the one or more other network participants;
      receiving a request from a second network participant to access the set of registry data from the first network participant, the second network participant executing, based on a second application platform compatible with the first application platform, on a second application; and
      providing access to the second network participant of at least a subset of data shared by the first network participant for collaboration.

\* \* \* \* \*